United States Patent
Sakurai

(10) Patent No.: US 10,987,904 B2
(45) Date of Patent: Apr. 27, 2021

(54) VISIBILITY CONTROL DEVICE FOR A VEHICLE

(71) Applicant: Toyota Jidosha Kabushiki Kaisha, Toyota (JP)

(72) Inventor: Hideyuki Sakurai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 41 days.

(21) Appl. No.: 16/530,419

(22) Filed: Aug. 2, 2019

(65) Prior Publication Data
US 2020/0070480 A1 Mar. 5, 2020

(30) Foreign Application Priority Data
Aug. 29, 2018 (JP) .............................. JP2018-160772

(51) Int. Cl.
| | |
|---|---|
| *B32B 17/10* | (2006.01) |
| *B60J 3/04* | (2006.01) |
| *G02F 1/1337* | (2006.01) |
| *G02F 1/1335* | (2006.01) |

(52) U.S. Cl.
CPC .......... *B32B 17/10504* (2013.01); *B60J 3/04* (2013.01); *G02F 1/1337* (2013.01); *G02F 1/133512* (2013.01); *B60Y 2400/303* (2013.01)

(58) Field of Classification Search
CPC .... B32B 17/10504; B60J 3/04; G02F 1/1337; G02F 1/133512; B60Y 2400/303
USPC .......................... 296/97.2, 96.19, 97.1, 97.3
See application file for complete search history.

(56) References Cited

U.S. PATENT DOCUMENTS

| | | | | |
|---|---|---|---|---|
| 3,961,181 A | * | 6/1976 | Golden | B60J 3/04 250/208.2 |
| 4,641,922 A | * | 2/1987 | Jacob | G02F 1/133371 296/97.2 |
| 6,536,828 B2 | * | 3/2003 | Love | B60J 3/04 296/96.19 |
| 8,143,563 B2 | * | 3/2012 | Broude | B60J 3/04 250/203.4 |
| 9,702,183 B1 | * | 7/2017 | Ochiai | B60J 3/007 |
| 10,493,825 B2 | * | 12/2019 | Woodrow | G02F 1/153 |

(Continued)

FOREIGN PATENT DOCUMENTS

| | | |
|---|---|---|
| JP | 2005145219 A | 6/2005 |
| JP | 2007308069 A | 11/2007 |

(Continued)

*Primary Examiner* — D Glenn Dayoan
*Assistant Examiner* — E Turner Hicks
(74) *Attorney, Agent, or Firm* — Dinsmore & Shohl LLP

(57) ABSTRACT

A visibility control device for a vehicle includes: a windshield that is provided at a front side of a vehicle cabin; a light-shielding portion that is provided at, or so as to correspond to, an area at a vehicle lower side of the windshield, and that is switchable between a light-shielding state and a light-transmitting state; a vehicle speed sensor that detects a speed of a vehicle; and a control unit that, in a case in which a vehicle speed detected by the vehicle speed sensor is equal to or greater than a predetermined value, performs control to switch the light-shielding portion to the light-shielding state, and in a case in which the vehicle speed is less than a predetermined value, performs control to switch the light-shielding portion to the light-transmitting state.

6 Claims, 10 Drawing Sheets

(56) References Cited

U.S. PATENT DOCUMENTS

| | | | |
|---|---|---|---|
| 2005/0280275 A1* | 12/2005 | Uenuma | B60R 1/00 296/84.1 |
| 2007/0102950 A1* | 5/2007 | Uematsu | B60J 1/2011 296/96.19 |
| 2009/0116098 A1* | 5/2009 | Chang | G02F 1/163 359/275 |
| 2016/0263970 A1 | 9/2016 | Tamaoki | |

FOREIGN PATENT DOCUMENTS

| | | |
|---|---|---|
| JP | 2008105533 A | 5/2008 |
| JP | 2016168931 A | 9/2016 |

* cited by examiner

VISIBILITY CONTROL DEVICE FOR A VEHICLE

CROSS-REFERENCE TO RELATED APPLICATION

This application is based on and claims priority under 35 USC 119 from Japanese Patent Application No. 2018-160772 filed on Aug. 29, 2018, the disclosure of which is incorporated by reference herein.

BACKGROUND

Technical Field

The present disclosure relates to a visibility control device for a vehicle.

Related Art

Japanese Patent Application Laid-Open (JP-A) No. 2007-308069 discloses an anti-glare device for a vehicle that enables the glare on a vehicle occupant to be reduced by controlling a light-shielded area using a shield portion that is disposed in an upper portion of a front windshield glass in accordance with detection results from an illuminometer provided in the vehicle.

In this anti-glare device for a vehicle, although the light-shielded area in the upper portion of the front windshield is controlled, when the vehicle is traveling at high speed, from the viewpoint of a vehicle occupant, the road surface in front of the vehicle also flows past at a high speed. As a result, there is a possibility that this might lead to the vehicle occupant experiencing a sense of discomfort, and may also cause the vehicle occupant to become fatigued.

SUMMARY

The present disclosure provides a visibility control device for a vehicle that may reduce any discomfort and fatigue experienced by a vehicle occupant even when a vehicle is traveling at high speed.

A first aspect of the present disclosure is a visibility control device for a vehicle including: a windshield that is provided at a front side of a vehicle cabin; a light-shielding portion that is provided at, or so as to correspond to, an area at a vehicle lower side of the windshield, and that is switchable between a light-shielding state and a light-transmitting state; a vehicle speed sensor that detects a speed of a vehicle; and a control unit that, in a case in which a vehicle speed detected by the vehicle speed sensor is equal to or greater than a predetermined value, performs control to switch the light-shielding portion to the light-shielding state, and in a case in which the vehicle speed is less than a predetermined value, performs control to switch the light-shielding portion to the light-transmitting state.

In the visibility control device for a vehicle of the first aspect, when the vehicle speed is equal to or greater than a predetermined value, a control unit performs control to switch a light-shielding portion to the light-shielding state. Accordingly, an angle of depression between a line of sight of a vehicle occupant and a road surface when the vehicle is traveling at high speed is reduced. As a result, any sense of discomfort or fatigue arising in the vehicle occupant is reduced.

In a second aspect of the present disclosure, in the first aspect, the windshield includes front-side glass that forms part of a vehicle front-side surface of the windshield and rear-side glass that forms part of a vehicle rear-side surface of the windshield, and the light-shielding portion is a sheet-shaped component that is disposed between the front-side glass and the rear-side glass.

In the visibility control device for a vehicle of the second aspect, a sheet-shaped light-shielding portion is disposed between front-side glass and rear-side glass that each form part of a windshield. Accordingly, at the same time as the thickness of the windshield is prevented from increasing, the size of the angle of depression between the line of sight of a vehicle occupant and the road surface when the vehicle speed is equal to or greater than a predetermined value is reduced.

In a third aspect of the present disclosure, in the first aspect, the light-shielding portion is a display device that is disposed at a vehicle lower side of an inner surface of the windshield.

In the visibility control device for a vehicle according to the third aspect, when a vehicle occupant is viewing an area in front of the vehicle, and, additionally, the vehicle speed is equal to or greater than a predetermined value, then the size of the angle of depression between the line of sight of the vehicle occupant and the road surface is reduced. Moreover, the functions of the light-shielding portion are integrated into the display unit.

A fourth aspect of the present disclosure, in any one of the first through third aspects, may further include an illuminance sensor that detects a brightness of a vehicle periphery, wherein in a case in which the brightness detected by the illuminance sensor is darker than a predetermined brightness, the control unit prohibits the light-shielding portion from performing light-shielding.

In the visibility control device for a vehicle of the fourth aspect, when the brightness detected by the illuminance sensor is smaller than a predetermined value, the light-shielding portion is prohibited from performing light-shielding. Accordingly, when the peripheral area around the vehicle is dark, such as at nighttime and the like, the angle of depression is not reduced.

In a fifth aspect of the present disclosure, in any one of the first through fourth aspects, the light-shielding state of the light-shielding portion may be formed by at least two or more light-shielding states in which surface areas of the light-shielded areas are mutually different, and the control unit controls the light-shielding portion such that the surface area of the light-shielded areas of the light-shielding portion becomes progressively larger as the vehicle speed detected by the vehicle speed sensor increases.

In the visibility control device for a vehicle of the fifth aspect, a light-shielding portion having at least two or more light-shielding states is controlled such that, as the vehicle speed increases, the surface area of the light-shielded areas also increases. Accordingly, as the speed at which the road surface flows past the vehicle becomes faster while the vehicle is traveling, the size of the angle of depression between the line of sight of the vehicle occupant and the road surface is reduced.

In a sixth aspect of the present disclosure, in any one of the first through fourth aspects, after the control unit has performed control to switch the light-shielding portion from the light-transmitting state to the light-shielding state, the control unit causes the light-shielding portion to maintain the light-shielding state for a predetermined time.

In the visibility control device for a vehicle of the sixth aspect, after the control unit has controlled the light-shielding portion, the light-shielding state is maintained for a predetermined time. Accordingly, if, for example, the vehicle speed changes in the vicinity of the predetermined value, the light-shielding portion can be prevented from switching excessively between the light-shielding state and the light-transmitting state.

According to the visibility control device for a vehicle of the present disclosure, any discomfort or fatigue experienced by a vehicle occupant may be reduced even when a vehicle is traveling at high speed.

BRIEF DESCRIPTION OF THE DRAWINGS

Exemplary embodiments of the present disclosure will be described in detail based on the following figures, wherein.

DETAILED DESCRIPTION

[First Exemplary Embodiment]

Next, a visibility control device for a vehicle according to the exemplary embodiments will now be described using FIG. 1 through FIG. 10. Note that an arrow FR, an arrow RH, and an arrow UP that are illustrated in the appropriate drawings respectively indicate a front side in a vehicle front-rear direction, a right side in a vehicle width direction, and an upper side in a vehicle up-down direction. Hereinafter, if simple front-rear or up-down directions are used in the following description, then, unless specifically stated otherwise, these refer respectively to the front-rear directions of the vehicle and the up-down directions of the vehicle. Additionally, the following description and drawings may be simplified where this is appropriate in order to clarify the description.

Figure 1:
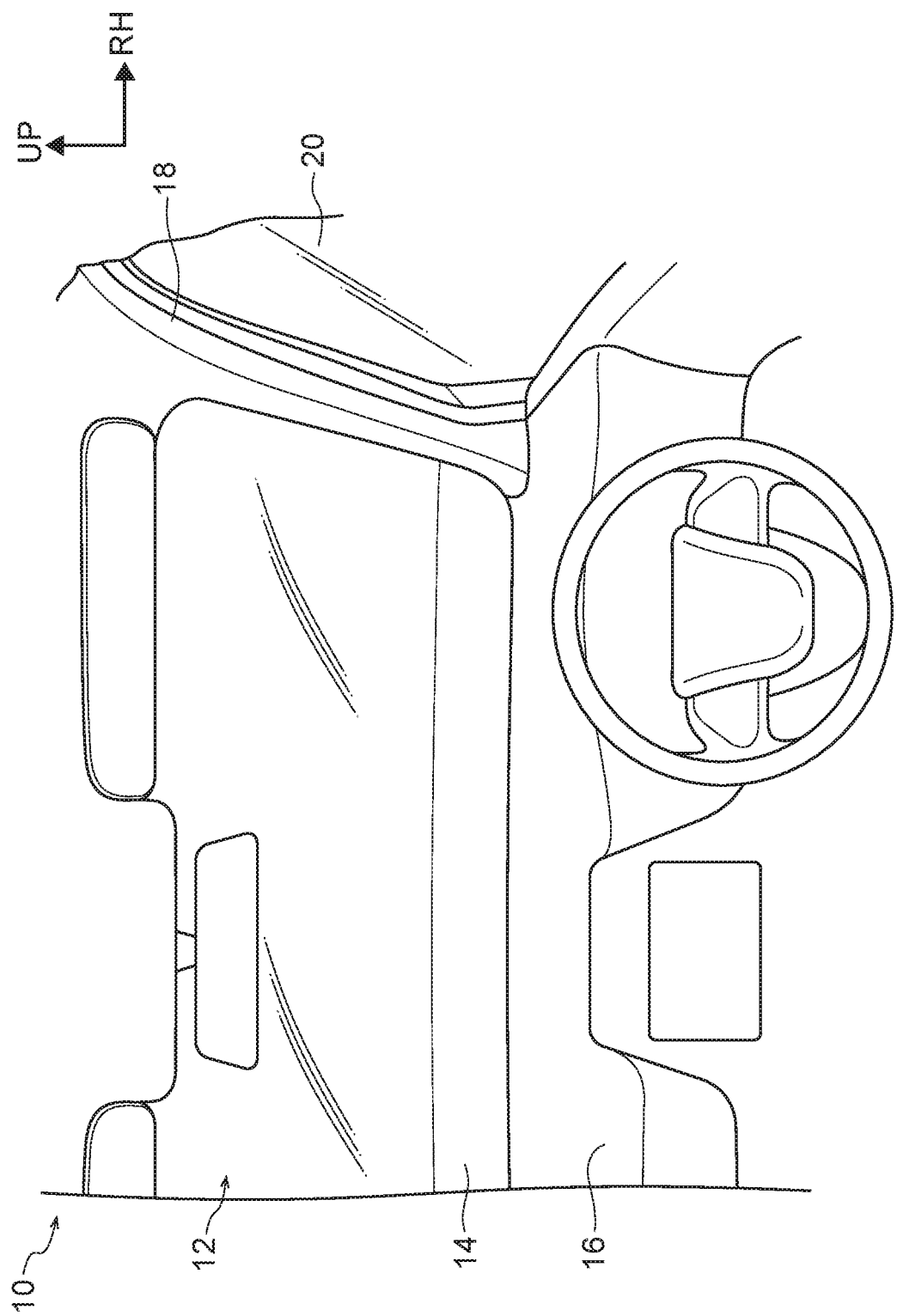
FIG. 1 is a schematic view as seen from a vehicle cabin side illustrating a front portion of a vehicle in which a visibility control device for a vehicle according to a first exemplary embodiment has been applied.

As illustrated in FIG. 1, a windshield 12 is provided in a front end portion of a vehicle cabin of a vehicle 10 in which a visibility control device for a vehicle according to the present exemplary embodiment has been installed.

The windshield 12 extends from a front end portion of an instrument panel 16 towards a vehicle upper side, and separates an exterior of the vehicle cabin of the vehicle 10 from an interior thereof. Additionally, in the present exemplary embodiment, as an example, the windshield 12 is formed from glass. Note that, in the present exemplary embodiment, the windshield 12 is formed from glass, however, the windshield 12 may instead be formed by a resin component made of polymethyl methacrylate (PMMA) or acrylic or the like.

Both end portions in the vehicle width direction of the windshield 12 are attached to front end portions of front pillars 18. When a front door is in a closed state, a front door frame (not illustrated in the drawings) that covers a vehicle side portion is disposed at a rear end portion of the front pillar 18. Front side-glass 20 is supported in the front door frame.

A front header panel (not illustrated in the drawings), whose longitudinal direction extends in the vehicle width direction, is disposed at a front end of a roof panel (not illustrated in the drawings) that covers the upper side of the vehicle. A vehicle upper end portion of the windshield 12 is attached to the front header panel.

Here, a light-shielding portion 14 that is capable of switching between a light-transmitting state and a light-shielding state is provided in a vehicle lower-side portion of the windshield 12. The light-shielding portion 14 is set in an area which extends in the vehicle width direction and has a predetermined width in the vehicle up-down direction. When the light-shielding portion 14 is in the light-transmitting state, as is illustrated in FIG. 1, a vehicle occupant is able to view the vehicle exterior through the light-shielding portion 14 from inside the vehicle cabin.

Figure 2:
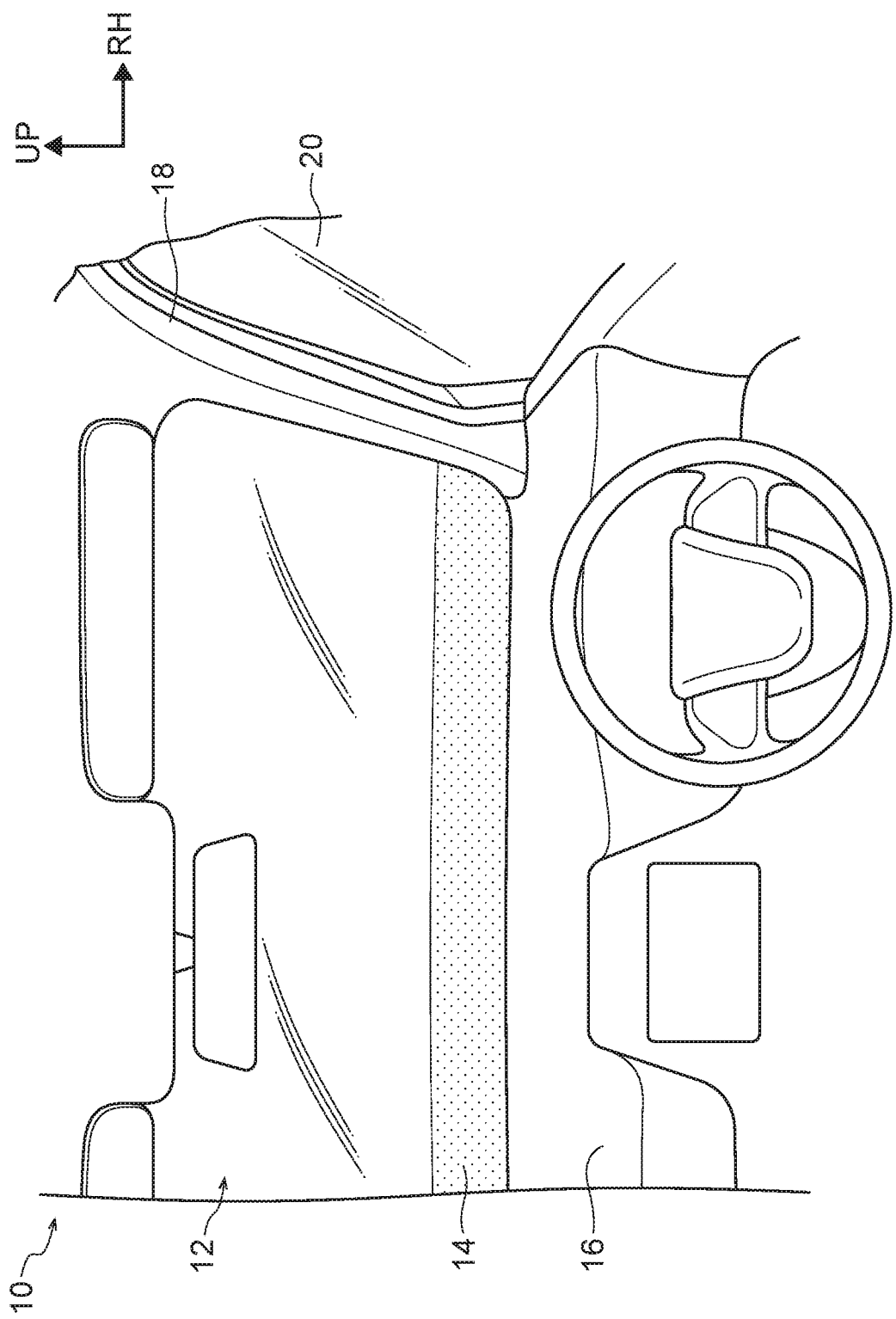
FIG. 2 is a schematic view corresponding to FIG. 1 illustrating a light-shielding portion in a light-shielding state.

In contrast, when the light-shielding portion 14 is in the light-shielding state, as is illustrated in FIG. 2, visibility of the vehicle exterior by a vehicle occupant from inside the vehicle cabin through the light-shielding portion 14 is restricted.

Here, the 'light-transmitting state' refers to a state in which the light-shielding portion 14 has sufficient visible light transmittance to enable a vehicle occupant to view the vehicle exterior. The light-transmitting state is a state in which, as an example, the visible light transmittance is 80% or more. The 'light-shielding state' refers to a state in which the light-shielding portion 14 has low visible light transmittance so that the ability of a vehicle occupant to view the vehicle exterior is restricted. The light-shielding state is a state in which, as an example, the visible light transmittance is 20% or less.

Figure 3:
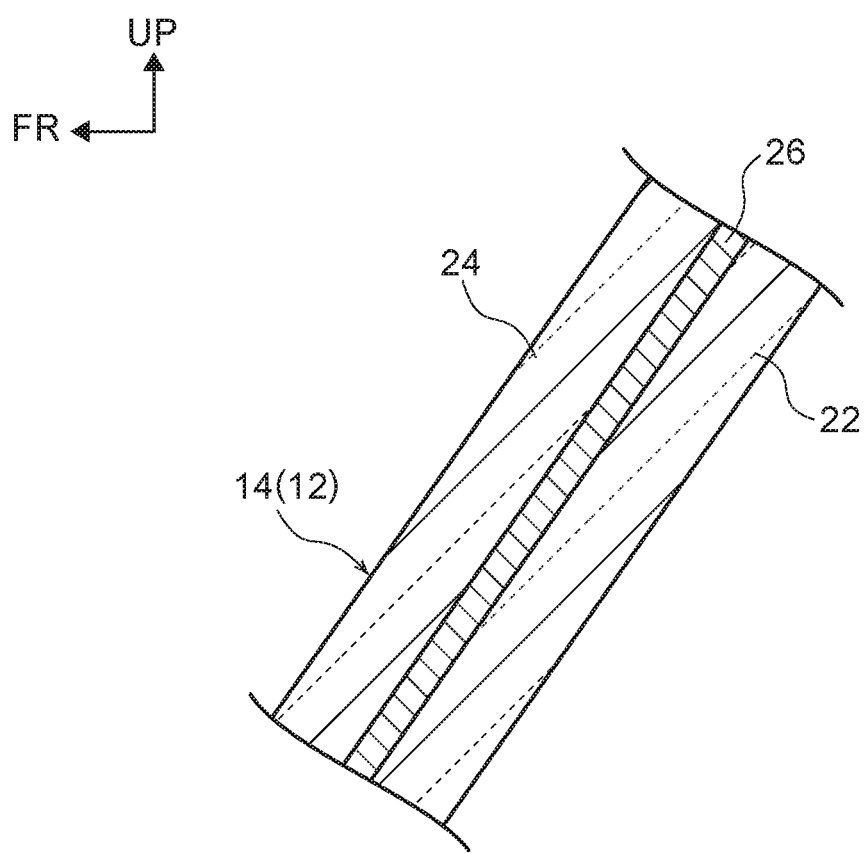
FIG. 3 is a cross-sectional view illustrating a lower portion of a windshield as seen from a vehicle width direction in the visibility control device for a vehicle of the first exemplary embodiment.

As illustrated in FIG. 3, a peripheral portion of the light-shielding portion 14 of the windshield 12 is formed by rear-side glass 22, front-side glass 24, and light-shielding liquid crystal 26, which is serving as a light-shielding component.

The rear-side glass 22 is transparent glass that is disposed on the vehicle cabin rear side of the windshield 12. The front-side glass 24 is disposed on the vehicle cabin front side of the windshield 12, and is the same transparent glass as that used for the rear-side glass 22.

In the set area of the light-shielding portion 14, the light-shielding liquid crystal 26 is disposed between the rear-side glass 22 and the front-side glass 24. Note that, in the range outside the set area of the light-shielding portion 14, an adhesive layer is interposed between the rear-side glass 22 and the front-side glass 24, so as to form what is known as laminated glass. The light-shielding liquid crystal 26 is formed such that the light transmittance thereof when the light-shielding liquid crystal 26 is being energized changes compared to when it is not being energized. In the present exemplary embodiment, as an example, the light-shielding liquid crystal 26 is formed such that the transmittance thereof is reduced when the light-shielding liquid crystal 26 is being energized.

Figure 4:
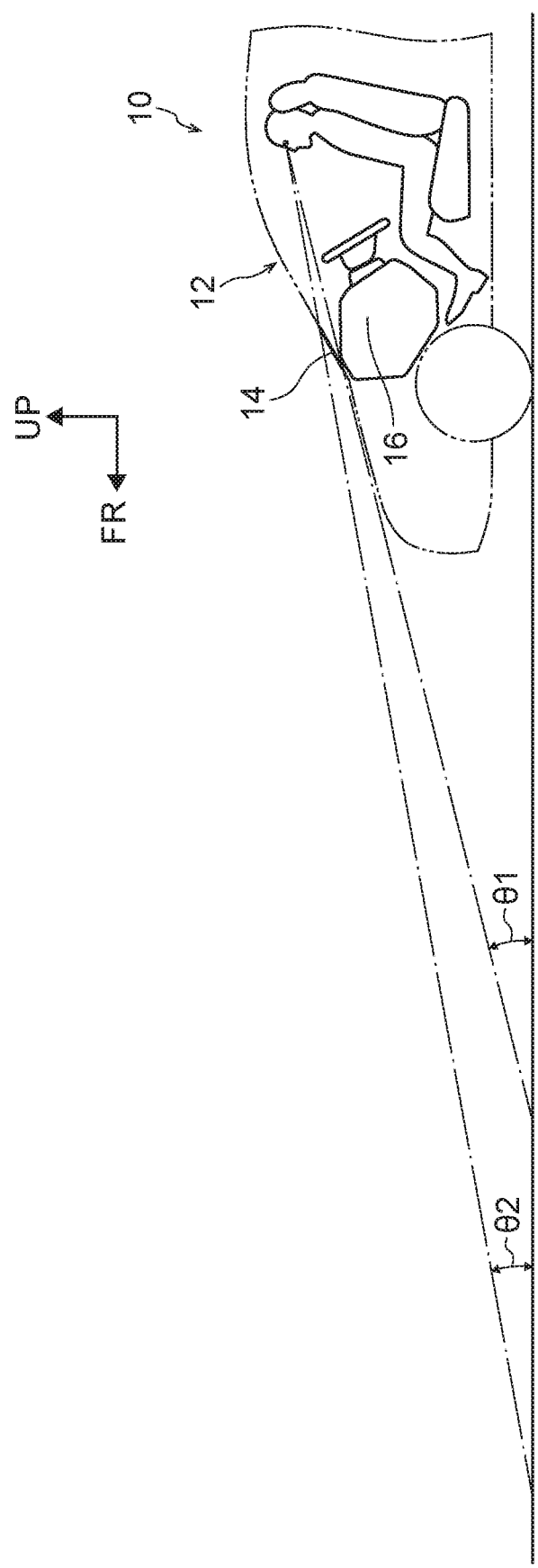
FIG. 4 is a side view illustrating an outline of a front portion of a vehicle in which the visibility control device for a vehicle according to the first exemplary embodiment has been applied.

When the light-shielding liquid crystal 26 is not being energized, because the light-shielding portion 14 is in the light-transmitting state, as is illustrated in FIG. 4, an angle between a line of sight of a vehicle occupant and a road surface (namely, an angle of depression) is θ1. In contrast, when the light-shielding liquid crystal 26 is being energized, because the light-shielding portion 14 is in the light-shielding state, the angle between the line of sight of the vehicle occupant and the road surface is θ2, so that the angle of depression is smaller than when the light-shielding liquid crystal 26 is not being energized.

Hereinafter, an example of a situation in which the light-shielding portion 14 is switched between the light-shielding state and the light-transmitting state will be described using FIG. 5 and FIG. 6.

Figure 5:
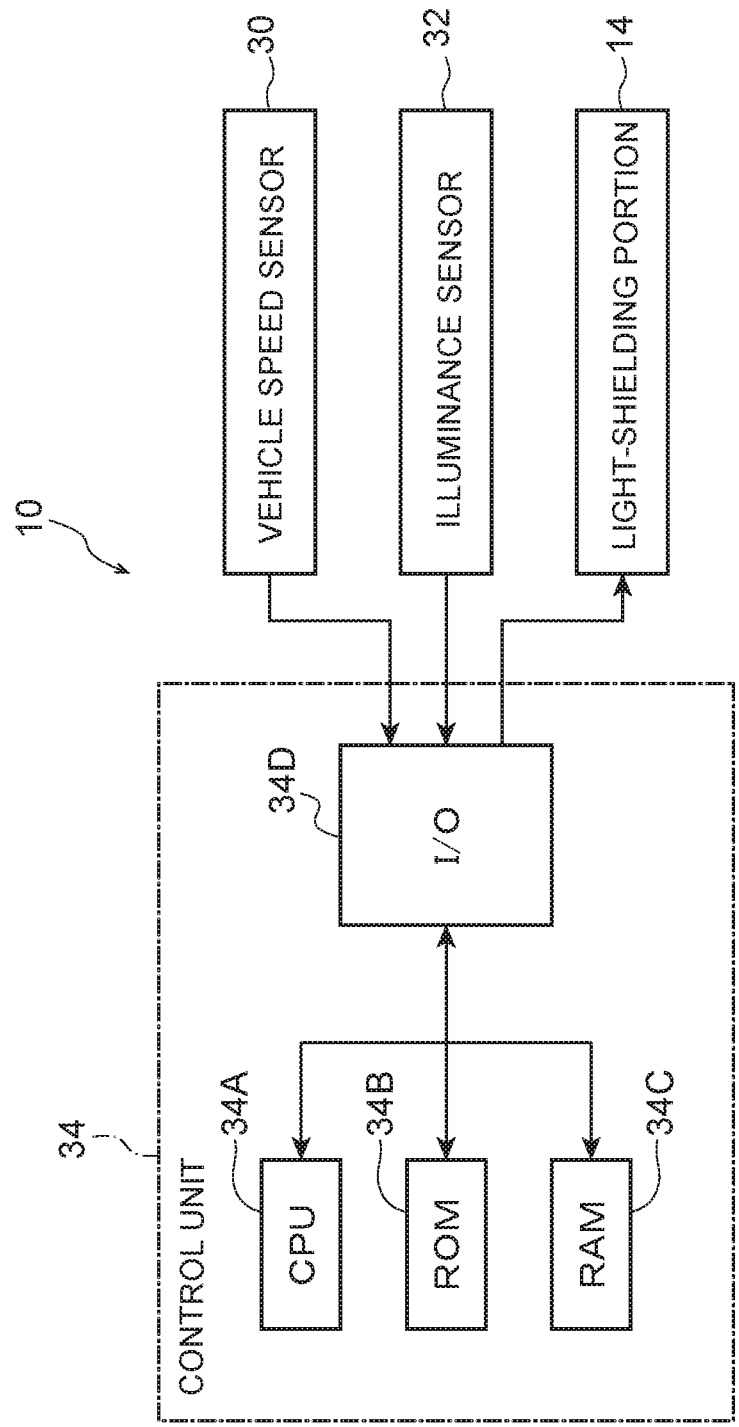
FIG. 5 is a block diagram according to the visibility control device for a vehicle of the first exemplary embodiment.

As is illustrated in FIG. 5, The visibility control device for a vehicle according to the present exemplary embodiment is formed by the light-shielding portion 14, a vehicle speed sensor 30, an illuminance sensor 32, and a control unit 34.

The vehicle speed sensor 30 detects a traveling speed of a vehicle and outputs detection results to the control unit 34. The vehicle speed sensor is provided in a location where a rotation speed changes in accordance with the vehicle speed such as, for example, in a brake rotor or a transmission, and detects the rotation speed that corresponds to the vehicle speed.

The illuminance sensor 32 detects a peripheral illuminance as being the peripheral brightness around the vehicle 10, and outputs detection results to the control unit 34. As an example, an illuminance sensor 32 is provided respectively on a front-side bumper and a rear-side bumper of the vehicle.

The control unit 34 is formed by a microcomputer to which are respectively connected a CPU 34A, ROM 34B, RAM 34C, and an I/O (input/output interface) 34D.

Various programs such as a program or the like that is used to control the light-transmitting state and the light-shielding state of the light-shielding portion 14 based on the detection results from the vehicle speed sensor 30 and the illuminance sensor 32 are stored in the ROM 34B.

The light-transmitting state and the light-shielding state of the light-shielding portion 14 are controlled as a result of a program stored in the ROM 34B being expanded in the RAM 34C and executed by the CPU 34A.

The vehicle speed sensor 30, the illuminance sensor 32, and the light-shielding portion 14 are connected to the I/O 34D. The I/O 34D acquires detection results from the vehicle speed sensor 30 and the illuminance sensor 32, and controls the light-transmitting state and the light-shielding state of the light-shielding portion 14 by comparing those results with a vehicle speed threshold value and an illuminance threshold value.

Next, specific processing performed by the control unit 34 of the visibility control device for a vehicle according to the present exemplary embodiment having the above described structure will be described. FIG. 6 is a flowchart illustrating an example of control performed by the control unit 34 of the visibility control device for a vehicle according to the present exemplary embodiment.

In step S100, whether or not an engine (E/G—not illustrated in the drawings) of the vehicle 10 has been turned ON is determined.

If the engine has been turned ON, the determination in step S100 is affirmative, and the process proceeds to step S102. If, however, the engine is turned OFF, the determination in step S100 is negative, and the process returns to step S100.

In step S102, the CPU 34A acquires an illuminance L from the detection results from the illuminance sensor 32, and the process proceeds to step S104.

In step S104, the CPU 34A determines whether or not the detected illuminance L is equal to or greater than a previously set illuminance threshold value Lth.

If the illuminance L is equal to or greater than the illuminance threshold value Lth, the determination in step S104 is affirmative, and the process proceeds to step S106. If, however, the illuminance L is less than the illuminance threshold value Lth, the determination in step S104 is negative, and the process proceeds to step S112 (described below).

In step S106, the CPU 34A acquires the vehicle speed V from the detection results from the vehicle speed sensor 30, and the process proceeds to the next step S108.

In step S108, the CPU 34A determines whether or not the detected speed V is equal to or greater than a previously set speed threshold value Vth.

If the speed V is equal to or greater than the speed threshold value Vth, the determination in step S108 is affirmative, and the process proceeds to step S110. If, however, the speed V is less than the speed threshold value Vth, the determination in step S108 is negative, and the process proceeds to step S112.

In step S110, the CPU 34A energizes the light-shielding portion 14, thereby switching the light-shielding portion 14 from the light-transmitting state to the light-shielding state. After the light-shielding portion 14 has been switched from the light-transmitting state to the light-shielding state, the process proceeds to step S114 (described below).

In step S112, by stopping the energization of the light-shielding portion 14, the CPU 34A switches the light-shielding portion 14 from the light-shielding state to the light-transmitting state.

In step S112, if the light-shielding portion 14 is already in the light-transmitting state, then the CPU 34A keeps the light-shielding portion 14 in the light-transmitting state. After the light-shielding portion 14 has been switched from the light-shielding state to the light-transmitting state, the process proceeds to the next step S114.

In step S114, the light-shielding state or the light-transmitting state of the light-shielding portion 14 is maintained for a predetermined time. In the visibility control device for a vehicle according to the present exemplary embodiment, as an example, this predetermined time is three seconds, and the predetermined time is measured by a timer or the like (not illustrated in the drawings) provided in the vehicle 10. After the predetermined time has elapsed, the process proceeds to the next step S116.

In step S116, whether or not the engine of the vehicle 10 has been turned OFF is determined.

Figure 6:
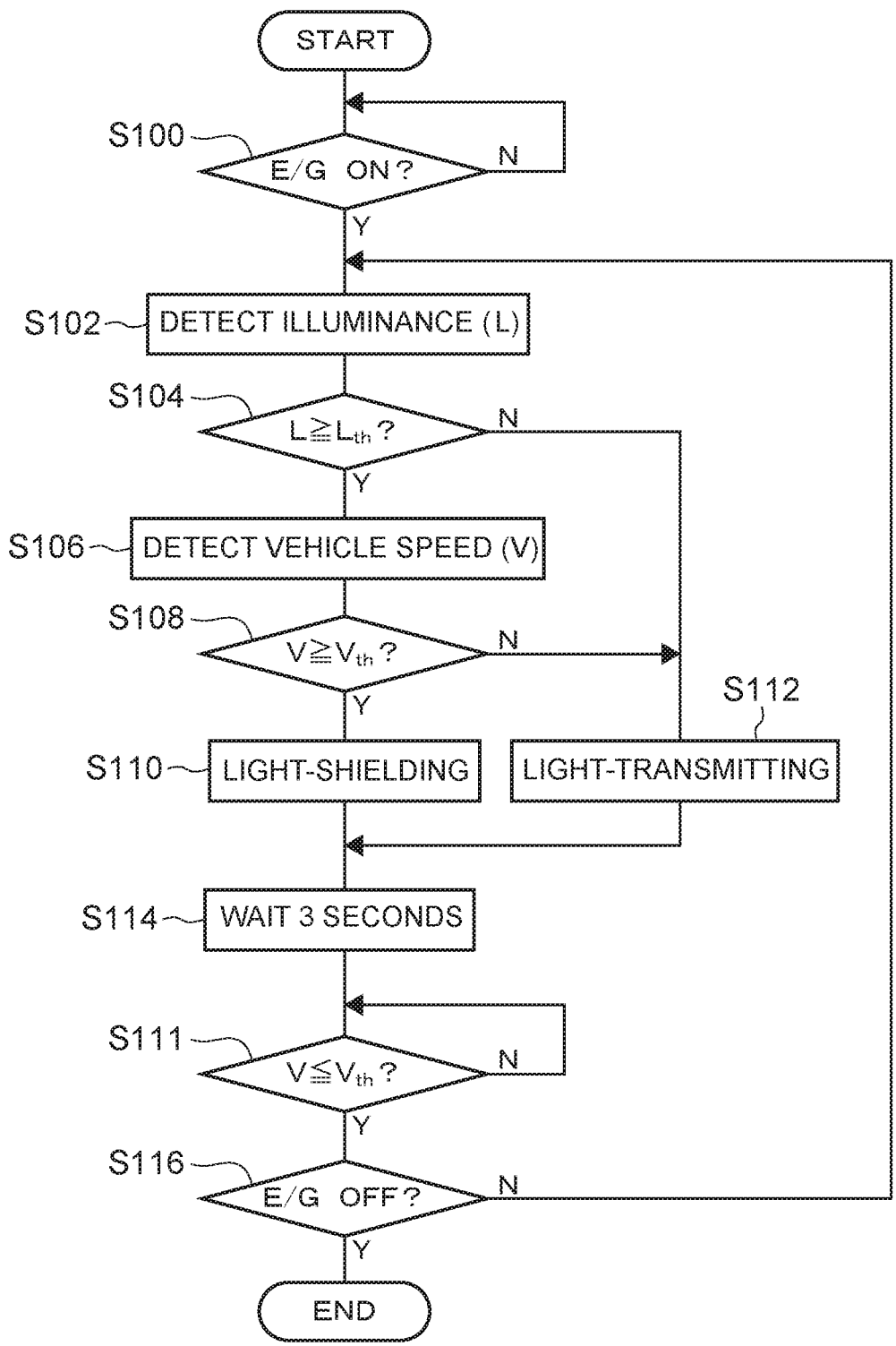
FIG. 6 is a control flowchart according to the visibility control device for a vehicle of the first exemplary embodiment.

If the engine is turned OFF, the determination in step S116 is affirmative, and the process illustrated in the flowchart in FIG. 6 is ended. If, however, the engine is turned ON, the determination in step S116 is negative and the process returns to step S102. The above-described processing is then repeated.

(Operation)

Next, an operation of the present exemplary embodiment will be described.

In the visibility control device for a vehicle of the present exemplary embodiment, when the vehicle speed is equal to or greater than the predetermined value Vth, the control unit 34 performs control to switch the light-shielding portion 14 to the light-shielding state. Accordingly, the angle of depression between the line of sight of a vehicle occupant and the road surface when the vehicle is traveling at high speed may be reduced to the angle θ2, and any sense of discomfort or fatigue caused by the road surface in front of the vehicle flowing past at high speed from the viewpoint of a vehicle occupant may be reduced.

In addition, when the illuminance is lower than the predetermined value Lth, the capability to perform control to switch the light-shielding portion 14 to the light-shielding state is restricted. Accordingly, in a state in which the peripheral area around the vehicle 10 is dark, such as at nighttime and the like, it is possible to inhibit the field of vision of a vehicle occupant from being restricted.

Furthermore, in the present exemplary embodiment, after the control unit 34 has controlled the light-shielding portion 14, the light-shielding state is maintained for a predetermined time. Accordingly, if, for example, the vehicle speed V changes in the vicinity of the speed threshold value Vth, the light-shielding portion 14 may be prevented from switching excessively between the light-shielding state and the light-transmitting state.

[Second Exemplary Embodiment]

Next, a visibility control device for a vehicle according to a second exemplary embodiment will be described with reference to FIG. 7 and FIG. 8. Note that structure of the second exemplary embodiment that is similar to that of the first exemplary embodiment is given the same descriptive symbol, and any description thereof is omitted where appropriate.

The present exemplary embodiment differs from the first exemplary embodiment in that the light-shielding portion 14 has plural light-shielding states (S1 through S4).

Figure 7A:
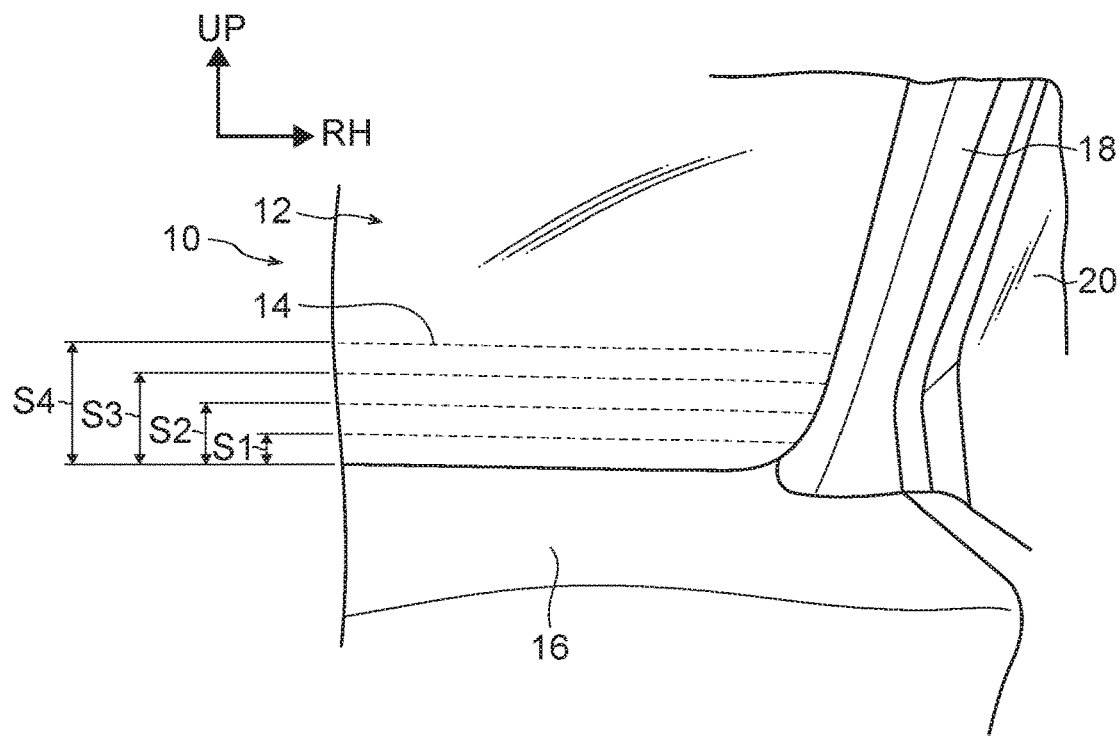
FIG. 7A is a schematic view illustrating a periphery of a light-shielding portion of a visibility control device for a vehicle of a second exemplary embodiment.

As is illustrated in FIG. 7A, in the visibility control device for a vehicle according to the present exemplary embodiment, the light-shielding portion 14 has plural light-shielded areas from S1 through to S4. These respective light-shielded areas have mutually different surface areas, and the surface area of the light-shielded areas increases towards the vehicle upper side progressively in sequence from the light-shielded area S1 through to the light-shielded area S4.

The respective switching from the light-shielded area S1 through to the light-shielded area S4 that is performed in the light-shielding portion 14 is achieved by switching the areas in the light-shielding liquid crystal 26 that are energized.

Figure 7B:
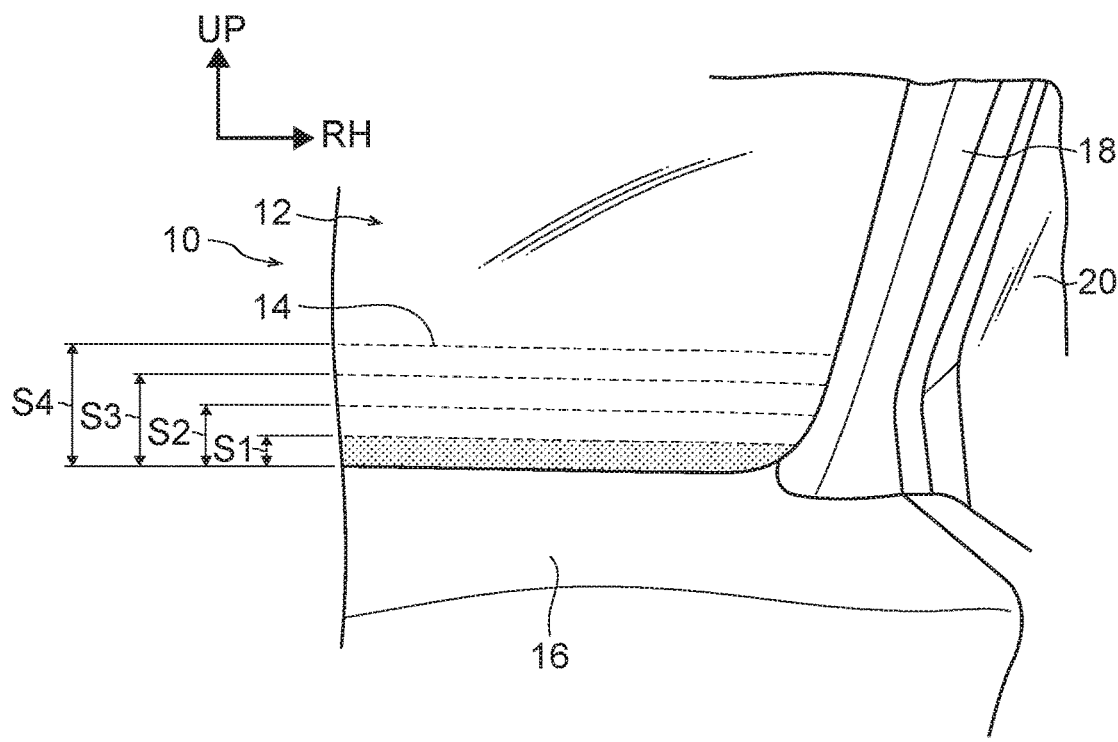
FIG. 7B is a schematic view corresponding to FIG. 7A illustrating a light-shielded area S in a light-shielded state.

For example, when energization of the light-shielding area S1 is performed, as is illustrated in FIG. 7B, by light-shielding the light-shielding area S1, the angle between the line of sight of the vehicle occupant and the road surface is reduced.

Next, specific processing performed by the control unit 34 of the visibility control device for a vehicle according to the present exemplary embodiment having the above-described structure will be described. FIG. 8 is a flowchart illustrating an example of control performed by the control unit 34 of the visibility control device for a vehicle according to the present exemplary embodiment.

In step S200, whether or not the engine (not illustrated in the drawings) of the vehicle 10 has been turned ON is determined.

If the engine has been turned ON, the determination in step S200 is affirmative, and the process proceeds to step S202. If, however, the engine is turned OFF, the determination in step S200 is negative, and the process returns to step S200.

In step S202, the CPU 34A acquires an illuminance L from the detection results from the illuminance sensor 32, and the process proceeds to step S204.

In step S204, the CPU 34A determines whether or not the detected illuminance L is equal to or greater than a previously set illuminance threshold value Lth.

If the illuminance L is equal to or greater than the illuminance threshold value Lth, the determination in step S204 is affirmative, and the process proceeds to step S206. If, however, the illuminance L is less than the illuminance threshold value Lth, the determination in step S204 is negative, and this step moves to step S224 (described below).

In step S206, the CPU 34A acquires the vehicle speed V from the detection results from the vehicle speed sensor 30, and the process proceeds to the next step S208.

In step S208, the CPU 34A determines whether or not the detected speed V is equal to or greater than a previously set speed threshold value V0.

If the speed V is equal to or greater than the speed threshold value V0, the determination in step S208 is affirmative, and the process proceeds to step S210. If, however, the speed V is less than the speed threshold value V0, the determination in step S208 is negative, and this step moves to step S224 (described below).

In step S210, the CPU 34A determines whether or not the detected speed V is equal to or greater than a previously set speed threshold value V1. Here, the speed threshold value V1 is set as a larger value than V0.

If the speed V is equal to or greater than the speed threshold value V1, the determination in step S210 is affirmative, and the process proceeds to step S212. If, however, the speed V is less than the speed threshold value V1, the determination in step S210 is negative, and this step moves to step S222 (described below).

In step S212, the CPU 34A determines whether or not the detected speed V is equal to or greater than a previously set speed threshold value V2. Here, the speed threshold value V2 is set as a larger value than V1.

If the speed V is equal to or greater than the speed threshold value V2, the determination in step S212 is affirmative, and the process proceeds to step S214. If, however, the speed V is less than the speed threshold value V2, the determination in step S212 is negative, and this step moves to step S220 (described below).

In step S214, the CPU 34A determines whether or not the detected speed V is equal to or greater than a previously set speed threshold value V3. Here, the speed threshold value V3 is set as a larger value than V2.

If the speed V is equal to or greater than the speed threshold value V3, the determination in step S214 is affirmative, and the process proceeds to step S216. If, however, the speed V is less than the speed threshold value V3, the determination in step S214 is negative, and this step moves to step S218 (described below).

In step S216, the CPU 34A energizes the area of S4 in FIG. 7 of the light-shielding portion 14, thereby switching the light-shielding portion 14 from the light-transmitting state to the light-shielding state S4. After the light-shielding portion 14 has been switched from the light-transmitting state to the light-shielding state S4, this step moves to step S226.

In step S218, the CPU 34A energizes the area of S3 in FIG. 7 of the light-shielding portion 14, thereby switching the light-shielding portion 14 from the light-transmitting state to the light-shielding state S3. After the light-shielding portion 14 has been switched from the light-transmitting state to the light-shielding state S3, this step moves to step S226.

In step S220, the CPU 34A energizes the area of S2 in FIG. 7 of the light-shielding portion 14, thereby switching the light-shielding portion 14 from the light-transmitting state to the light-shielding state S2. After the light-shielding portion 14 has been switched from the light-transmitting state to the light-shielding state S2, this step moves to step S226.

In step S222, the CPU 34A energizes the area of S1 in FIG. 7 of the light-shielding portion 14, thereby switching the light-shielding portion 14 from the light-transmitting state to the light-shielding state S1. After the light-shielding portion 14 has been switched from the light-transmitting state to the light-shielding state S1, this step moves to step S226.

In step S224, by stopping the energization of the light-shielding portion 14, the CPU 34A switches the light-shielding portion 14 from the light-shielding state to the light-transmitting state. In step S224, if the light-shielding portion 14 is already in the light-transmitting state, then the CPU 34A keeps the light-shielding portion 14 in the light-transmitting state. After the light-shielding portion 14 has been switched from the light-shielding state to the light-transmitting state, the process proceeds to the next step S226.

In step S226, the light-shielding state or the light-transmitting state of the light-shielding portion 14 is maintained for a predetermined time. In the visibility control device for a vehicle according to the present exemplary embodiment, as an example, this predetermined time is two seconds, and after the predetermined time has elapsed, the process proceeds to step S228.

In step S228, whether or not the engine of the vehicle 10 has been turned OFF is determined.

Figure 8:
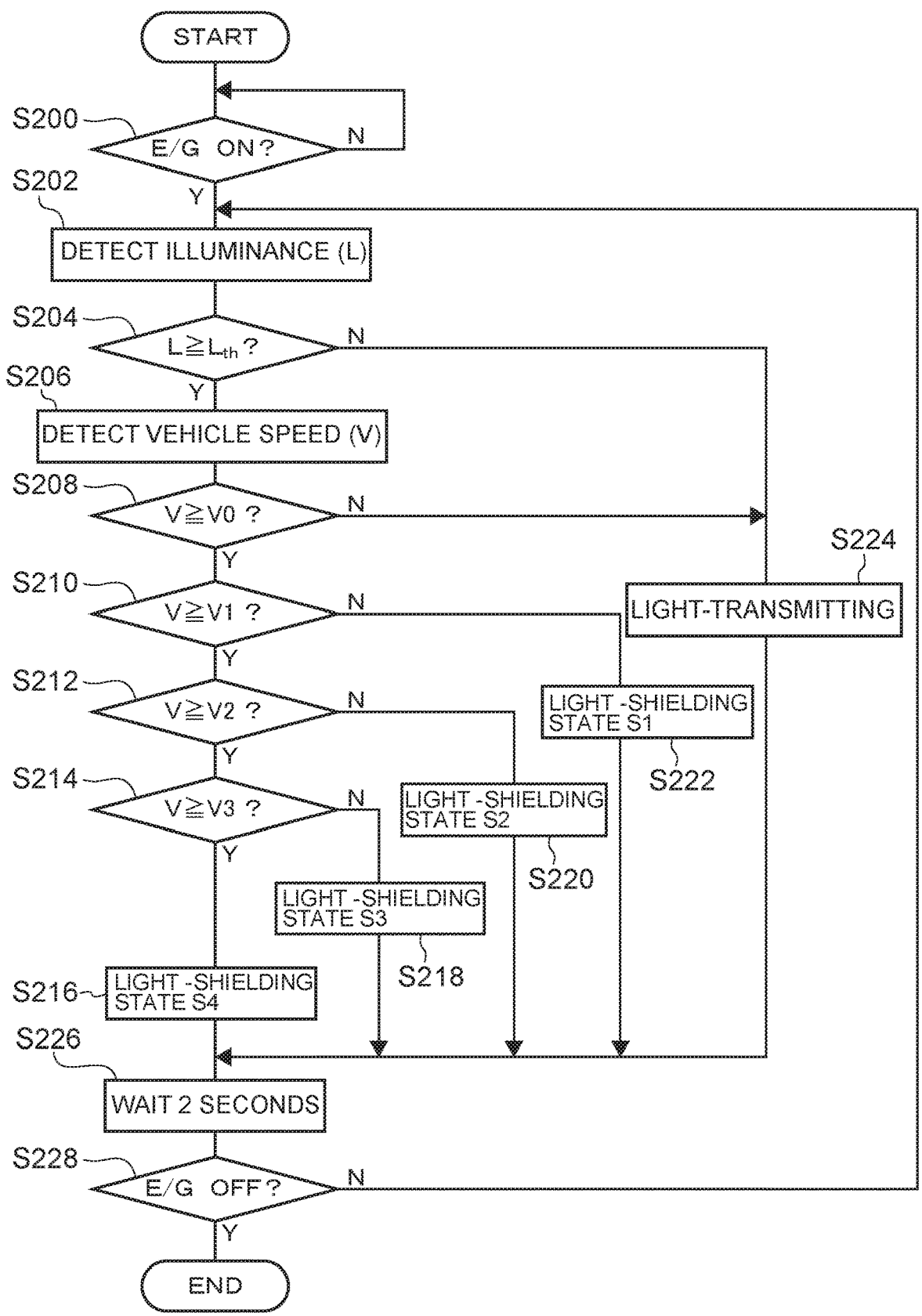
FIG. 8 is a control flowchart according to the visibility control device for a vehicle of the second exemplary embodiment.

If the engine is turned OFF, the determination in step S228 is affirmative, and the process illustrated in the flowchart in FIG. 8 is ended. If, however, the engine is turned ON, the determination in step S228 is negative and the process returns to step S202. The above-described processing is then repeated.

(Operation)

Next, an operation of the present exemplary embodiment will be described.

In the visibility control device for a vehicle of the present exemplary embodiment, a light-shielding portion 14 having plural light-shielding states is controlled such that, as the vehicle speed increases, the surface area of the light-shielded areas becomes progressively larger. Accordingly, the angle of depression between the line of sight of a vehicle occupant and the road surface may be progressively reduced as the speed at which the road surface flows past becomes faster when the vehicle is traveling.

[Third Exemplary Embodiment]

Next, a visibility control device for a vehicle according to a third exemplary embodiment will be described with reference to FIG. 9 and FIG. 10.

The present exemplary embodiment differs from the first and second exemplary embodiments in that the light-shielding portion 14 is replaced by a head-up display device 40 (hereinafter, referred to as a HUD 40).

Figure 9:
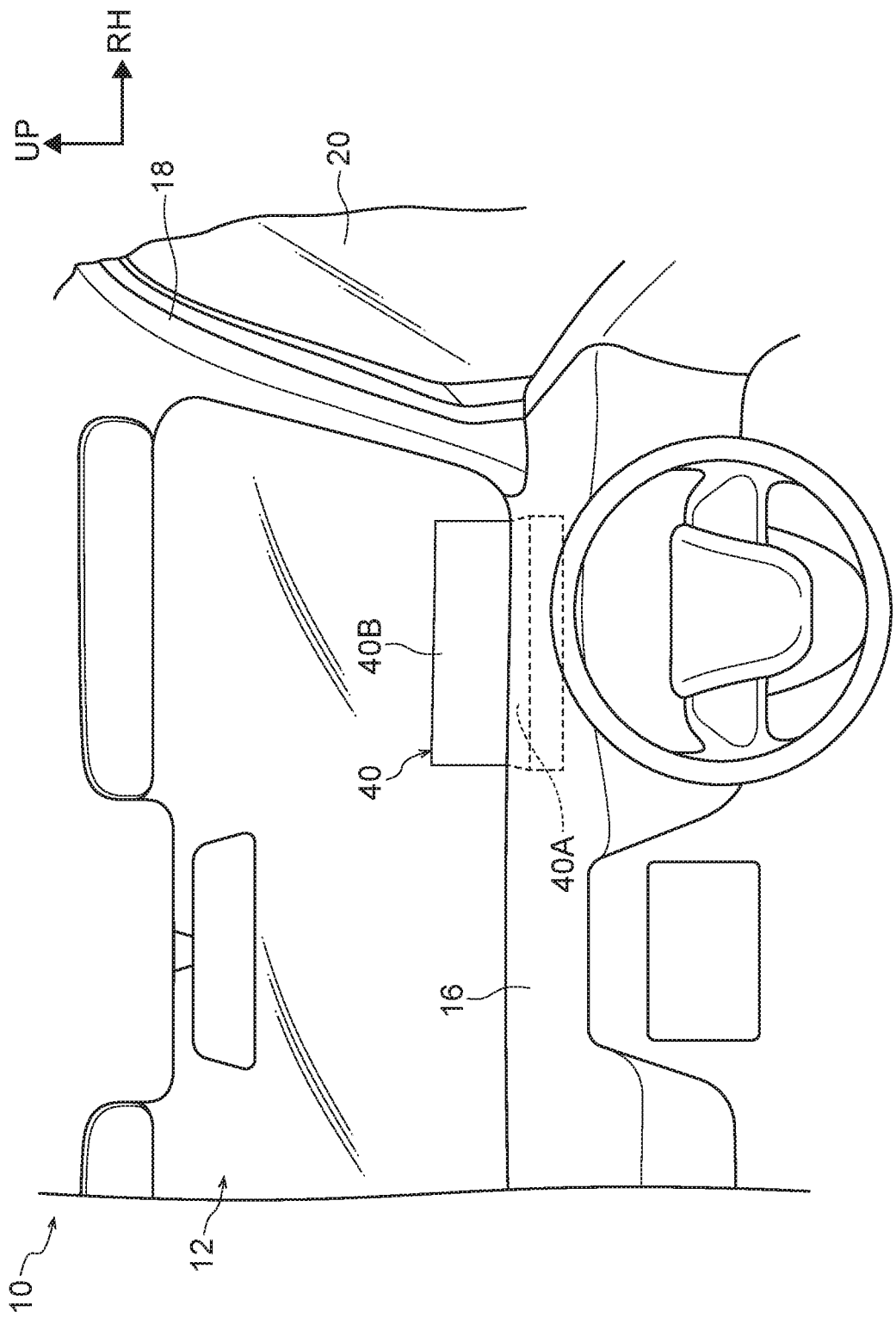
FIG. 9 is a schematic view as seen from a vehicle cabin side illustrating a front portion of a vehicle in which a visibility control device for a vehicle according to a third exemplary embodiment has been applied.
Figure 10:
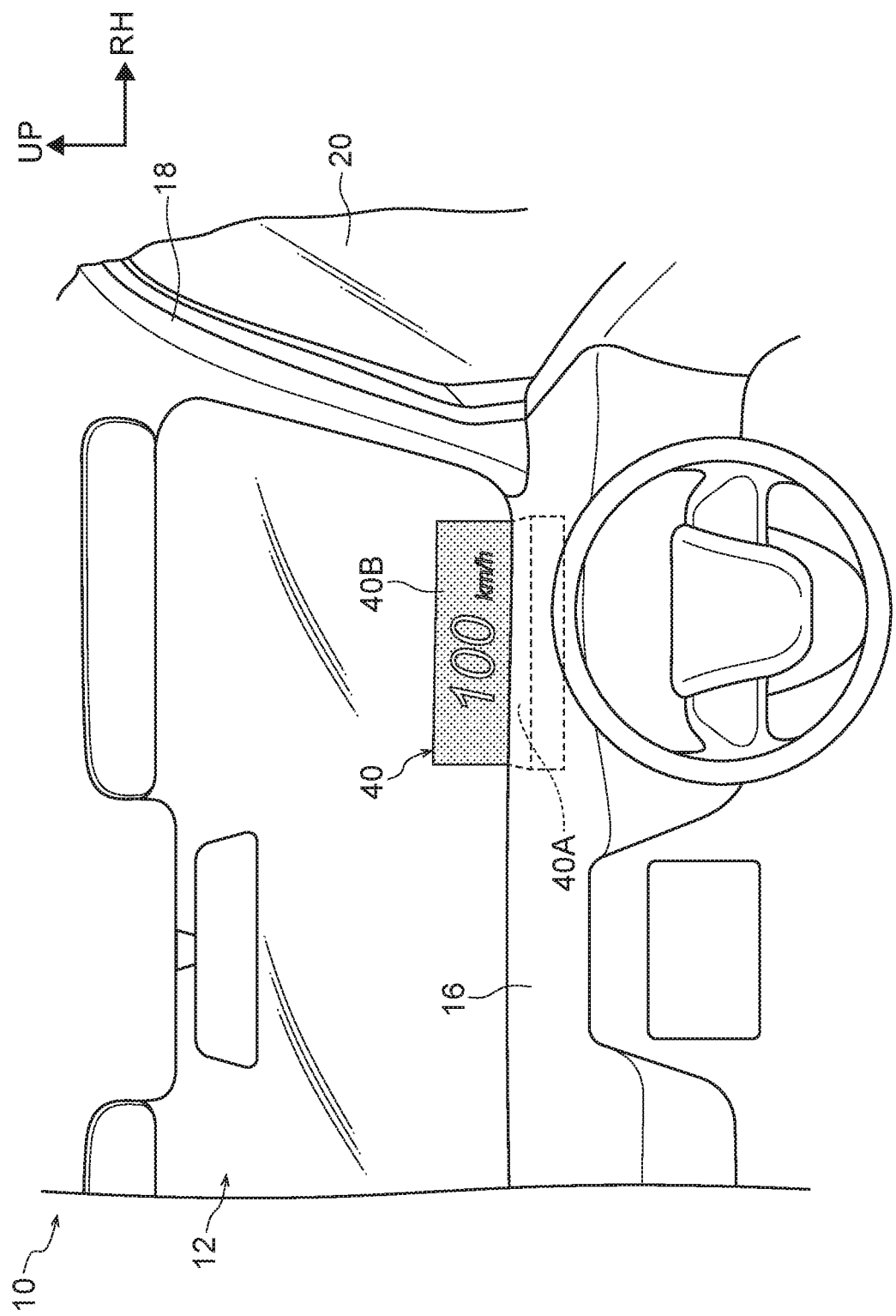
FIG. 10 is a schematic view corresponding to FIG. 9 illustrating a light-shielding portion in a light-shielding state.

In FIG. 9, the HUD 40 is provided on the vehicle front side of a driver's seat. The HUD 40 displays basic vehicle information such as the traveling speed of the vehicle 10 and the like by linking with various instruments such as, for example, meters and the like (not illustrated in the drawings).

The HUD 40 is incorporated into the instrument panel 16 of the vehicle, and is provided with a light source portion 40A that is formed by light sources such as, for example, LED and the like, and with a transparent display portion 40B that is provided in front of the instrument panel 16, and that projects light emitted from the light source portion 40A within a visual field in front of the driver's seat as display images.

In the visibility control device for a vehicle according to the present exemplary embodiment, by changing the light emitted from the light source portion 40A, the display portion 40B may be switched between the light-transmitting state and the light-shielding state.

For example, the display portion 40B may be placed in a light-transmitting state by not projecting any display on the display portion 40B, or by emitting light from the light source portion 40A in such a way that, from the viewpoint of a vehicle occupant, the background of the display portion 40B appears transparent.

In contrast, the display portion 40B may be placed in a light-shielding state by light-shielding the entire display portion 40B, or by emitting light from the light source portion 40A in such a way that, from the viewpoint of a vehicle occupant, the background of the display portion 40B is light-shielded. More specifically, on the display portion 40B illustrated in FIG. 10, as an example, the vehicle speed detected by the vehicle speed sensor 30 is displayed while the background thereof is light-shielded using a black color.

Note that the control performed by the control unit 34 in the visibility control device for a vehicle according to the present exemplary embodiment is based on the control flowchart illustrated in FIG. 6. Accordingly, a detailed description thereof is not given here.

(Operation)

An operation of the present exemplary embodiment will now be described.

In the visibility control device for a vehicle according to the present exemplary embodiment, the size of the angle of depression formed between the line of sight of a vehicle occupant and the road surface is reduced both when the vehicle occupant is viewing in the vehicle forward direction, and when the vehicle speed is equal to or greater than a predetermined value. Moreover, because the functions of the light-shielding portion are integrated into the HUD 40, the present exemplary embodiment has the merit that the scale of the structure may be reduced compared to a structure in which the light-shielding portion 14 is provided in the windshield 12.

A visibility control device for a vehicle according to a first exemplary embodiment through a third exemplary embodiment has been described above, however, the present disclosure is not limited to this. Various modifications and the like may be made to the present disclosure insofar as they do not depart from the spirit or scope of the present disclosure.

For example, in the above-described examples a structure is described in which light shielding is performed on the windshield 12 only on the vehicle right side, which is where the driver's seat is disposed, however, the present disclosure is not limited to this, and it is also possible to employ a structure in which light shielding is performed in the same way on the windshield 12 on the vehicle left side where the front passenger's seat is disposed.

Furthermore, in the first exemplary embodiment and second exemplary embodiment, a light-transmitting liquid crystal is used as the light-shielding component, however, the present disclosure is not limited to this, and another type of component may instead be used provided that it is capable of switching between a light-transmitting state and a light-shielding state. For example, organic EL (Electro Luminescence) may also be used for the light-shielding component. In addition, a gas chromic type of dimming sheet or the like that is formed in a sheet shape may also be used for the light-shielding component.

Furthermore, in the third exemplary embodiment, the display portion 40B of the HUD 40 is provided separately from the glass of the windshield 12, however, the present disclosure is not limited to this, and it is also possible for the display portion 40B to form part of a lower-side portion of the windshield 12, or to be integrated with the lower-side portion of the windshield 12.

What is claimed is:

1. A visibility control device for a vehicle comprising:
    a windshield that is provided at a front side of a vehicle cabin;
    a light-shielding portion that is provided at, or so as to correspond to, an area at a vehicle lower side of the windshield, and that is switchable between a light-shielding state and a light-transmitting state;
    a vehicle speed sensor that detects a speed of the vehicle; and
    a control unit that, in a case in which a vehicle speed detected by the vehicle speed sensor is equal to or greater than a predetermined value, performs control to switch the light-shielding portion to the light-shielding state, and in a case in which the vehicle speed is less than the predetermined value, performs control to switch the light-shielding portion to the light-transmitting state, wherein
    the light-shielding portion includes a plurality of mutually different surface areas each defining a portion of the light-shielding portion, and
    the control unit controls the light-shielding portion such that a total surface area of the light-shielding portion switched to the light-shielding state becomes progressively larger as the vehicle speed detected by the vehicle speed sensor increases beyond the predetermined value.

2. The visibility control device for a vehicle according to claim 1, wherein:
    the windshield includes front-side glass that forms part of a vehicle front-side surface of the windshield and rear-side glass that forms part of a vehicle rear-side surface of the windshield, and
    the light-shielding portion is a sheet-shaped component that is disposed between the front-side glass and the rear-side glass.

3. The visibility control device for the vehicle according to claim 1, wherein the light-shielding portion is a display device that is disposed at a vehicle lower side of an inner surface of the windshield.

4. The visibility control device for a vehicle according to claim 1, further comprising an illuminance sensor that detects a brightness of a vehicle periphery,
    wherein, in a case in which the brightness detected by the illuminance sensor is darker than a predetermined brightness, the control unit prohibits the light-shielding portion from performing light-shielding.

5. The visibility control device for a vehicle according to claim 1, wherein, after the control unit has performed control to switch the light-shielding portion from the light-transmitting state to the light-shielding state, the control unit causes the light-shielding portion to maintain the light-shielding state for a predetermined time.

6. The visibility control device for a vehicle according to claim 1, wherein:
    the windshield includes front-side glass that forms part of a vehicle front-side surface of the windshield and rear-side glass that forms part of a vehicle rear-side surface of the windshield, and
    the light-shielding portion is a light-shielding liquid crystal that is disposed between the front-side glass and the rear-side glass, and that has a reduced transmittance when energized.

* * * * *